United States Patent Office 3,295,928
Patented Jan. 3, 1967

3,295,928
PRODUCTION OF HYDROGEN PEROXIDE
Brian K. Howe, 62 Halfway Ave., St. Albans, England; Stanley Andrus, 29 King St., Luton, England; and Geoffrey Noel Davies, 5 Baronet Road, Warrington, England
No Drawing. Filed Sept. 19, 1962, Ser. No. 224,823
18 Claims. (Cl. 23—207)

This application is a continuation-in-part of our application Serial No. 821,656, filed June 22, 1959, now abandoned. This invention relates to an improved process for the production of hydrogen perovide by the alternate steps of reduction of anthraquinones, particularly the alkylated anthraquinones, and oxidation of the reduced product back to the anthraquinone, hydrogen peroxide being produced during the oxidation steps. More particularly, this invention is concerned with the regeneration of the hydrogen peroxide-producing capacity of solutions used in such a process, the peroxide-producing capacity of which has become reduced by degradation. It is also concerned with a process by which degeneration is arrested by the continuous use of the regeneration process during the operation of the peroxide producing process.

It is well known that hydrogen peroxide can be produced by a process employing anthraquinones dissolved in suitable solvents, e.g., United Kingdom specification No. 465,070 describes a process wherein an alkylated anthraquinone is hydrogenated in a solvent by means of hydrogen in the presence of a catalyst to the corresponding anthrahydroquinone which, after separation of the catalyst, is oxidized with oxygen to produce hydrogen peroxide with regeneration of the alkylated anthraquinone. The process is cyclic, the alkylated anthraquinone being returned to the hydrogenator after removal of hydrogen peroxide by aqueous extraction.

2-ethyl anthraquinone and 2-tertiary butyl anthraquinone have been most widely mentioned as suitable quinones while the literature describes a wide range of solvents, including methyl naphthalene with diisobutyl carbinol, esters of cyclohexanol with aromatic hydrocarbons, aliphatic ketones, chlorinated hydrocarbons, aromatic ketones, and aromatic alcohols and their esters. The hydrogenation catalyst used originally was Raney nickel but more recently palladium on an inert support such as alumina, silica gel and sodium aluminum silicate, silica alumina, calcium phosphate, and magnesium oxide or hydroxide has been suggested.

Continuous recycling of the working solution results eventually in the building up of materials relatively valueless in the production of hydrogen peroxide in the present context, with a consequent decrease in the hydrogen peroxide-producing capacity of said solution.

To some extent a reduction in degradation may be achieved by converting only part, about half of the anthraquinone content of the working solution, to the anthrahydroquinone. However, such a practice does not eliminate byproduct formation representing conversion to materials with little or no peroxide-producing value, which eventually build up to relatively high concentrations by continuous operation. It should be noted in passing that the tetrahydroanthraquinone, formed during the cyclic process, is not to be regarded as an inert material. The tetrahydro form like the parent compound has hydrogen peroxide-producing capacity though the rate of oxidation of the tetrahydroanthrahydroquinone is somewhat slower than that of the anthrahydroquinone.

Recently it has been disclosed that the degraded working solution may be regenerated by contacting the working solution with solid catalysts such as activated magnesia or alumina, at a temperature of above 55° C. This regeneration process can be employed at any stage of the cycle but it is found to be most effective when applied to the solution which has been oxygenated and then extracted to separate the hydrogen peroxide, e.g., to the solution just before it re-enters the hydrogenator. Another material found effective in reconverting these so-called degrated autoxidation solutions is sodium aluminum silicate.

It is an object of this inention to provide an effective and practical process for regenerating degraded working solutions of the type indicated whereby their hydrogen peroxide-producing capacities may be restored or substantially increased.

It is a further object of this invention to provide a process which may be applied in a continuous or intermittent manner either before or after significant degradation has taken place. Where applied before any significant degradation has taken place the purpose is to arrest or eliminate the occurrence of this degradation.

It has now been found according to this invention that reconversion of inert compounds in the working solutions to peroxide-producing substances may be effected by a combined treatment of the degraded solution with an organic or inorganic base and with oxygen or an oxygen-containing gas or hydrogen peroxide or other oxidizing agent.

According to this invention a process is provided for regenerating the hydrogen peroxide-producing capacity of a solution comprising an anthraquinone dissolved in a solvent therefor which capacity has become diminished through use in a process for synthesizing hydrogen peroxide involving cyclically hydrogenating said anthraquinone, oxidizing the resultant anthrahydroquinone, and separating by aqueous extraction the hydrogen peroxide formed, or for regenerating the hydrogen peroxide-producing capacity of solids derived from said anthraquinone and separated from such a solution, wherein said solution or said solids being of the chemical composition which obtains in the cycle after aqueous extraction and before hydrogenation are treated with oxygen or an oxygen-containing gas or hydrogen peroxide or other oxidizing agent in the presence of an inorganic or organic base. Enough base should be present to keep the solution basic throughout the oxygen absorption.

According to an embodiment of the invention a process is provided for the production of hydrogen peroxide involving alternately and in solution hydrogenating an alkylated anthraquinone and oxidizing the resulting anthrahydroquinone which is recycled to the hydrogenation step and separating by aqueous extraction, the hydrogen peroxide formed, wherein the whole or a portion of the solution cyclically hydrogenated, oxidized and extracted is subjected either continuously or intermittently to treatment with oxygen or oxygen-containing gas or hydrogen peroxide or other oxidizing agent in the presence of an inorganic or organic base, such treatment being effected after the stage in which the hydrogen peroxide is removed from the oxidized solution by aqueous extraction and prior to the stage wherein said solution is hydrogenated.

Preferably the base is a water-soluble base such as an alkali metal hydroxide.

Preferably the base is used in alcoholic solution.

Preferably the treatment with the base and oxygen or other oxidizing agent is carried out on a portion of the organic solution withdrawn from the cycle, said portion being washed with water prior to the return thereof to the cycle.

Preferably also the treatment of the degraded solution is carried out in combination with a treatment of the degraded solution with a bed of particulate solid material, for example, a porous artificial aluminum silicate well known per se for the reconversion of degraded solutions;

the bed treatment being effected either before or contemporaneously with said treatment with the base and oxygen or other oxidizing agent, in which later case a portion of the cyclic solution is subjected to the treatment with the base and oxygen or other oxidizing agent while the remainder or a portion of the remainder is contacted with the said bed.

In the bed treatment, preferably the degraded working solution is contacted with sodium aluminum silicate at a temperature of at least 90° C.

It is unnecessary artificially to elevate the temperature of the degraded solution to obtain satisfactory reconversion by the process of the present invention.

When applied to the cycle, the reconversion technique the subject of this invention is effected after the oxidized solution has passed through the hydrogen peroxide aqueous extraction column and before this solution enters the hydrogenator. With certain solvents free base is undesirable in the system and in these circumstances the batch of degraded solution being treated in accordance with this invention is water washed before return of the treated organic solution to the cycle. Thus the base should be water-soluble. Since alkalis such as sodium hydroxide attack aluminum it is desirable to use equipment made of stainless steel in those parts of the cycle where, as a result of this treatment, alkali is present.

As will be seen from the results given below the reconversion obtained by the process of this invention is greater normally than that obtained with the solids previously mentioned. In these circumstances, when embodying the process in the cycle it is best to take advantage both of the increased conversion obtained by the process of the present invention and the rather easier method of operation possible with the solids. Thus, a portion (say 10 percent) of the cyclic solution is passed continuously through a bed of the particulate solid while a portion of the remainder (say 10 percent) is treated batch-wise in accordance with this invention. The reaction vessel may be of the kind often used for the oxidation of the reduced solution, i.e., one in which air is bubbled through the solution having entered the reactor through a gas disperser. If desired, an agitator may be fitted.

With solutions containing 40 percent of unidentified material as hereinafter defined, about 1 liter at normal temperature pressure of oxygen and preferably 3 to 4 liters at normal temperature pressure of oxygen should be contacted with each liter of degraded solution. Smaller quantities of oxygen may prove effective though the amount of oxygen required for effective conversion is always greater than that dissolved in the cyclic solution and present at the stage of the cycle in question. In certain circumstances it may be possible to provide sufficient oxygen in the form of hydrogen peroxide at the stage of the cycle in question by lowering the extraction efficiency. In this case care should be taken lest other than minimal amounts of oxygen and/or hydrogen peroxide find their way to the hydrogenator.

It is, of course, possible to treat both solids recovered from the cyclic solution as well as concentrated solution containing the degraded intermediate.

In a most advantageous embodiment of this process which allows for marked increase reconversion of degraded anthraquinones involves the use of sodium hydroxide or potassium hydroxide as the water-soluble base in 8 to 17 Normal aqueous solutions. Such concentrations are particularly advantageous where an ester, for example, methylcyclohexanol acetate, is employed as a solvent for the anthraquinone. It is found that these highly concentrated solutions of sodium hydroxide and potassium hydroxide repress the rate of hydrolysis of the ester solvents while at the same time give enhanced rates of reconversion of the working solution. In addition, it is also found that the rate of reconversion increases with increase in alkali strength of the solution, and that concentrations in excess of 17 Normal tend to cause undesirable side reactions.

Tables I and II below relate to the treatment of 1:1 solvent mixtures of xylene and methylcyclohexyl acetate containing 2-ethyl-anthraquinone, tetrahydroethyl-anthraquinone and the degradation products thereof, referred to as "Unidentified material." Working solutions comprising other anthraquinones, e.g., methyl-, propyl-, isopropyl-, and butyl-anthraquinones and other solvents can be regenerated effectively in the same manner notwithstanding the conditions obtained during the cyclic process, and, in particular, the catalyst used, which in this case was carrier-supported palladium.

The heading "conversion" refers to percentage conversion and is calculated as follows:

(a)

$$\text{percent conversion} = 100 \times \left[1 - \frac{\text{(Final total solids)} - \text{(Final total quinones)}}{\text{(Initial total solids)} - \text{(Initial total quinones)}}\right]$$

Equation $a$ gives an approximate percent reconversion because it does not take into account the effect of small variation in total solids concentration which occurs as a result of the treatment. Accordingly, "reconversion" would be more accurately calculated as follows:

(b)

Reconversion percent = $100 \times$ $$\left[1 - \frac{\text{Final percent unidentified material in total solids}}{\text{Initial percent unidentified material in total solids}}\right]$$

This equation is only employed in tubulating the results set forth in Table IV below.

In all the following experiments 50 milliliters of the organic solution, the solids content of which is given in the first line of figures in Table II, were added to a glass shaker vessel of about 150 milliliter capacity which was agitated at the rate of 300 cycles per minute, there being a connection to a calibrated gas burette filled with oxygen. The base was added to the reaction vessel through a side arm and the reactions performed at 21° C.

In Table I the effect is measured in terms of time for an uptake of 75 milliliters of oxygen to occur, different bases being employed.

Comparison of results in Table II shows that the reconversion obtained with sodium hydroxide and oxygen alone is equal to that obtained firstly by treatment with particulate sodium aluminum silicate and then with the combined sodium hydroxide/oxygen treatment. "EAQ" means ethylanthraquinone and "$H_4EAQ$" means tetrahydroethyl anthraquinone.

TABLE I

| Base | Quantity | Time to take* up 75 mls. $O_2$ (minutes) |
|---|---|---|
| Aqueous sodium hydroxide: | | |
| 4 N | 50 | 4 |
| 2 N | 50 | 26 |
| N | 50 | 50 |
| N/10 | 50 | 200 |
| Aqueous potassium hydroxide: | | |
| 2N | 50 | 12 |
| N | 50 | 39 |
| Alcoholic potassium hydroxide: N/10 | 15 (EtOH) | >½ |
| Sodium ethoxide: | | |
| N/5 | 10 | >½ |
| N/10 | 10 | 1½ |
| Concentrated ammonia | 15 | 140 |
| Saturated calcium hydroxide | 50 | 240 |
| Pyridine | 50 | 85 |
| Triethylamine | 50 | 12 |
| | 7.5(+7.5 EtOH) | 10 |
| | 2(+13 EtOH) | 17 |

*Total uptake approximately 100 milliliters.

TABLE II

| Treatment given to the degraded solution (degraded solution referred to as "O") | Analyses relative to grams/liter for total solids | | | Conversion (percent) |
|---|---|---|---|---|
| | Unidentified Material | EAQ +H₄EAQ | Total Solids | |
| "O" before treatment (i) | 40 | 60 | 100 | |
| "O" treated with 4 N-NaOH/O₂ (ii) | 23 | 77 | 100 | 43 |
| "O" treated with Doucil (iii) | 32 | 68 | 100 | 20 |
| Solution (iii) treated with 4 N-NaOH/O₂ | 25 | 75 | 100 | 22 |

(NOTE.—Indicating further reconversion—the final result being approximately equal to that obtained by treatment of "O" with 4 N-NaOH/O₂ only.)

In the following experiments, the results of which are tabulated in Table III, 50 milliliters of the organic solution described above, the total solids content of which was 100 grams per liter before treatment (of which 32 grams per liter was ethyl anthraquinone, 29 grams per liter was tetrahydroethyl anthraquinone, and the remainder was "unidentified material") were added to a glass shaker vessel of about 150 milliliters capacity and shaken in an atmosphere of oxygen with the same volume of alkali, or with 0.375 mole of the solid alkali. The first column of Table III indicates the treatment given, the second column gives the concentration of ethylanthraquinone in grams per liter, the third column the concentration of tetrahydroethyl anthraquinone in grams per liter, and the concentration of total solids is given in the fifth column. The concentration of "unidentified material" after treatment is provided by substracting the figures in column 4 from the figures in column 5. The percent reconversion is given in column 6.

TABLE III

| Treatment | EAQ (g./l.) | H₄EAQ (g./l.) | Total (g./l.) | Total Solids (g./l.) | Percent Reconversion |
|---|---|---|---|---|---|
| (1) | (2) | (3) | (4) | (5) | (6) |
| 3 N=NaOH | 36.0 | 41.0 | 77.0 | 101.6 | 41.0 |
| 3 N=KOH | 34.5 | 43.5 | 78.0 | 99.4 | 43.5 |
| 12 N=NaOH | 42.0 | 41.0 | 83.0 | 102.1 | 56.5 |
| 12 H=KOH | 43.0 | 39.0 | 82.0 | 95.1 | 54.0 |
| Solid NaOH | 47.0 | 30.5 | 77.5 | 98.3 | 42.5 |
| Solid KOH | 48.0 | 19.0 | 67.0 | 87.9 | 45.0 |

The oxygen uptake at room temperature and pressure associated with reconversion only was in the region of 100 milliliters. In the experiments with solid sodium and potassium hydroxides, considerable dehydrogenation also took place accounting for a further 200 to 300 milliliters of oxygen uptake.

Table III shows that in experimentations utilizing low concentrated aqueous solutions of potassium and sodium hydroxides in the range of 3 N, the percent conversion, though of a high order, is not as great as the percent conversion obtainable when the normality of the solution is in excess of 8 N up to 17 N. Table II also shows that when the concentration of sodium and potassium hydroxide is in excess of 17 Normal, that the percent reconversion is also reduced, though a high order of reconversion is obtainable. Thus, most desirable results in terms of enhanced percent reconversion is obtainable when the sodium hydroxide and potassium hydroxide are employed in aqueous solution in concentrations described above.

Utilizing the Equation b described above for the determination of reconversion and the procedures described for the experiments employed for obtaining the results tabulated in Table III above, the following results were found:

TABLE IV

| Treatment | Initial total solids (g./l.) | Composition of initial total solids | | Composition of final total solids | | Reconversion (percent) |
|---|---|---|---|---|---|---|
| | | Quinones (percent) | Unidentified (percent) | Quinones (percent) | Unidentified (percent) | |
| 3 N-NaOH | 100 | 61 | 39 | 75.9 | 24.1 | 38 |
| 3 N-KOH | 100 | 61 | 39 | 78.4 | 21.6 | 45 |
| 10 N-NaOH | 97 | 60.7 | 39.3 | 80.5 | 19.5 | 50 |
| 12 N-NaOH | 100 | 61 | 39 | 81.2 | 18.8 | 52 |
| 12 N-KOH | 100 | 61 | 39 | 86.3 | 13.7 | 65 |
| 14 N-NaOH | 97 | 58.4 | 41.6 | 78.4 | 21.6 | 48 |
| 17 N-NaOH | 97 | 60.7 | 39.3 | 80.1 | 19.9 | 49 |
| 17.75 N-NaOH | 104 | 62.5 | 37.5 | 81.8 | 18.2 | 51.5 |
| Solid NaOH | 100 | 61 | 39 | 78.9 | 21.1 | 46 |
| 4 N-NaOH | 97 | 60.7 | 39.3 | 73.3 | 26.7 | 32 |
| 5 N-NaOH | 97 | 60.7 | 39.3 | 72.5 | 27.5 | 30 |
| 6 N-NaOH | 97 | 60.7 | 39.3 | 72.1 | 27.9 | 29 |
| 7 N-NaOH | 97 | 60.7 | 39.3 | 71.7 | 28.3 | 28 |
| 8 N-NaOH | 97 | 60.7 | 39.3 | 74.5 | 25.5 | 35 |
| 10 N-NaOH | 97 | 60.7 | 39.3 | 74.5 | 25.5 | 35 |
| 17 N-NaOH | 97 | 60.7 | 39.3 | 72.1 | 27.9 | 29 |

Although the present invention has been described with reference to the specific details of certain embodiments, it is not intended that such details should be regarded as limitations upon the scope of the invention, except insofar as included in the accompanying claims.

We claim:

1. In the autoxidation process for the production of hydrogen peroxide wherein an anthraquinone solution is consecutively reduced and oxidized to produce hydrogen peroxide, which is extracted, the improvement wherein the anthraquinone solution is treated, while in the oxidized state after the extraction of substantial amounts of hydrogen peroxide, by contacting said solution with a water-soluble base and an oxidizing agent capable of supplying oxygen thereto.

2. In the autoxidation process wherein an anthraquinone is consecutively reduced and oxidized to produce hydrogen peroxide, which is extracted, and a nonreactive by-product, the improvement wherein the anthraquinone is treated, while in the oxidized state after the extraction of substantial amount of hydrogen peroxide, by concurrently contacting by-product and anthraquinone with a water-soluble base and an oxidizing agent capable of supplying oxygen to the by-product and anthraquinone.

3. The process of claim 2 wherein the anthraquinone is in solution and said solution is maintained basic throughout said treatment.

4. In the autoxodiation process wherein an anthraquinone is in solution is consecutively reduced and oxidized to produce hydrogen peroxide, which is extracted, the improvement wherein the anthraquinone is treated, while in the oxidized state after the extraction of substantial amounts of hydrogen peroxide, by contacting it with a water-soluble base from the group consisting of sodium hydroxide, potassium hydroxide, alkali metal alcoholates, ammonia, alkaline earth metal hydroxides, and tertiary amines and an oxidizing agent capable of supplying oxygen to the solution.

5. A process according to claim 2 wherein the base is a water-soluble inorganic base.

6. In a process for the production of hydrogen peroxide involving alternately and in solution hydrogenating an alkylated anthraquinone and oxidizing the resulting anthrahydroquinon the oxidation product of which is recycled to the hydrogenation step after separating by aqueous extraction hydrogen peroxide formed, the steps of subjecting a portion of the solution while in the oxidized anthraquinone state to treatment with a gas comprising oxygen and in contact with a water-soluble inorganic base until a substantial proportion of oxygen has been absorbed, such treatment being effected after the stage in which hydrogen peroxide is removed from the oxidized solution by aqueous extraction and prior to the stage wherein said solution is hydrogenated, and the solution being maintained basic throughout the absorption of the oxygen, washing the thus treated solution with water and returning the washed solution to the cycle.

7. In a process for the production of hydrogen peroxide involving alternately and in solution hydrogenating an alkylated anthraquinone and oxidizing the resulting anthrahydroquinone the oxidation product of which is recycled to the hydrogenation step while separating by aqueous extraction hydrogen peroxide formed, the steps of subjecting at least a portion of the solution while in the oxidized anthraquinone state to treatment with a bed of particulate solid material and then to treatment with a gas comprising oxygen and in contact with a water-soluble base until a substantial proportion of oxygen has been absorbed, such treatment being effected after the stage in which hydrogen peroxide is removed from the oxidized solution by aqueous extraction and prior to the stage wherein said solution is hydrogenated, and the solution being maintained basic throughout the absorption of the oxygen.

8. The process of claim 1 wherein the anthraquinone composition is a solution.

9. The process of claim 1 wherein said base is a water-soluble inorganic base.

10. The process of claim 9 wherein said base is sodium hydroxide.

11. The process of claim 1 wherein the anthraquinone compounds are alkylated anthraquinones.

12. The process of claim 6 wherein said base is sodium hydroxide in an alcoholic solution.

13. In the process of claim 2, the improvement wherein the hydrogen peroxide is only partially extracted, leaving hydrogen peroxide in said anthraquinone and treating said anthraquinone in said oxidized state by contacting it with a water-soluble base.

14. The process of claim 13 wherein said base is from the group consisting of sodium hydroxide, potassium hydroxide, alkali metal alcoholates, ammonia, alkaline earth metal hydroxides, and tertiary amines.

15. The process of claim 7 wherein said bed material is sodium aluminum silicate.

16. In the cyclic process for the production of hydrogen peroxide involving alternately and in solution hydrogenating an anthraquinone and oxidizing the resulting anthrahydroquinone, the oxidation product of which is recycled to the hydrogenation step after separating by aqueous extraction hydrogen peroxide formed, the step of subjecting at least a portion of the solution while in the oxidized anthraquinone state to treatment in contact with an aqueous solution of a water-soluble base from the class consisting of potassium hydroxide and sodium hydroxide in concentrations of from 8 to 17 Normal, with an oxidizing agent of the group consisting of oxygen, an oxygen containing gas and hydrogen peroxide, capable of supplying oxygen to the solution, such treatment being effected after the stage in which hydrogen peroxide is removed from the oxidized solution.

17. The process of claim 16 wherein the hydrogen peroxide is only partially extracted, leaving hydrogen peroxide in said anthraquinone.

18. In the cyclic process for the production of hydrogen peroxide involving alternatively and in solution hydrogenating an anthraquinone and oxidizing the resulting anthrahydroquinone, the oxidation product of which is recycled to the hydrogenation step after separating by aqueous extraction hydrogen peroxide formed, the step of subjecting at least a portion of the solution while in the oxidized anthraquinone state to treatment in contact with a water soluble base and with an oxidizing agent selected from the group consisting of oxygen and oxygen-containing gas and hydrogen peroxide capable of supplying oxygen to the solution, such treatment being effected after the stage the hydrogen peroxide is removed from the oxidized solution.

References Cited by the Examiner
UNITED STATES PATENTS

| | | | |
|---|---|---|---|
| 2,860,036 | 11/1958 | Lait | 23—207 |
| 2,901,491 | 8/1959 | Eller et al. | 260—369 |
| 2,909,532 | 10/1959 | Cosby et al. | 260—369 |
| 2,940,987 | 6/1960 | Eller et al. | 260—369 |

MILTON WEISSMAN, *Primary Examiner.*

MAURICE A. BRINDISI, OSCAR R. VERTIZ,
*Examiners.*

O. F. CRUTCHFIELD, *Assistant Examiner.*